(12) United States Patent
Sammour et al.

(10) Patent No.: US 7,733,835 B2
(45) Date of Patent: Jun. 8, 2010

(54) METHOD AND SYSTEM FOR REDUCING POWER CONSUMPTION OF A WIRELESS TRANSMIT/RECEIVE UNIT

(75) Inventors: Mohammed Sammour, Montreal (CA); Sudheer A. Grandhi, Mamaroneck, NY (US)

(73) Assignee: InterDigital Technology Corporation, Wilmington, DE (US)

(*) Notice: Subject to any disclaimer, the term of this patent is extended or adjusted under 35 U.S.C. 154(b) by 994 days.

(21) Appl. No.: 11/458,295

(22) Filed: Jul. 18, 2006

(65) Prior Publication Data

US 2007/0037548 A1   Feb. 15, 2007

Related U.S. Application Data

(60) Provisional application No. 60/700,808, filed on Jul. 20, 2005, provisional application No. 60/750,283, filed on Dec. 14, 2005.

(51) Int. Cl.
*H04W 4/00* (2009.01)
*H04B 1/16* (2006.01)

(52) U.S. Cl. ............... 370/338; 455/343.2; 455/343.4; 455/343.5

(58) Field of Classification Search ............. 370/311, 370/336, 338; 455/343.1–343.6
See application file for complete search history.

(56) References Cited

U.S. PATENT DOCUMENTS

| | | | |
|---|---|---|---|
| 5,566,366 A | | 10/1996 | Russo et al. |
| 6,009,319 A | * | 12/1999 | Khullar et al. ............. 340/7.38 |
| 6,236,674 B1 | | 5/2001 | Morelli et al. |
| 6,463,307 B1 | | 10/2002 | Larsson et al. |
| 6,760,671 B1 | | 7/2004 | Batcher et al. |
| 6,804,542 B1 | * | 10/2004 | Haartsen ..................... 455/574 |

(Continued)

FOREIGN PATENT DOCUMENTS

EP   1 318 687   6/2003

(Continued)

OTHER PUBLICATIONS

Adrian Stephens, *Joint Proposal: High Throughput Extension to the 802.11 Standard: MAC*, IEEE P802.11 Wireless LANs, (Dec. 2, 2005).

(Continued)

*Primary Examiner*—Lester Kincaid
*Assistant Examiner*—Nathan Mitchell
(74) *Attorney, Agent, or Firm*—Volpe and Koenig PC (57) ABSTRACT

A method and system for reducing power consumption of a wireless transmit/receive unit (WTRU), (i.e., mobile station), are disclosed. A first WTRU measures a predetermined parameter and determines whether the measured predetermined parameter exceeds a threshold. If so, the first WTRU sends a sleep frame to a second WTRU. The sleep frame indicates sleep duration. The second WTRU receives the sleep frame and enters a sleep state for the sleep duration. The predetermined parameter may be an inactivity time of wireless medium. The second WTRU may or may not be allowed to send transmission to the first WTRU during the sleep duration. The sleep frame may be a control frame, a management frame, a data frame or an action frame. One of a multiple receiver aggregate (MRA) multi-poll frame, a power saving aggregation descriptor frame, or a power save multi-poll frame may be used as the sleep frame.

71 Claims, 5 Drawing Sheets

U.S. PATENT DOCUMENTS

| | | | |
|---|---|---|---|
| 6,829,493 B1 * | 12/2004 | Hunzinger | 455/574 |
| 6,999,799 B1 * | 2/2006 | Almassy | 455/574 |
| 7,075,903 B1 * | 7/2006 | Solum | 370/311 |
| 7,194,261 B2 * | 3/2007 | Emeott et al. | 455/426.2 |
| 7,230,933 B2 * | 6/2007 | Bahl et al. | 370/311 |
| 7,260,068 B2 * | 8/2007 | Hsieh et al. | 370/311 |
| 7,292,545 B2 * | 11/2007 | Maki et al. | 370/311 |
| 7,295,827 B2 * | 11/2007 | Liu et al. | 455/343.2 |
| 7,356,316 B2 | 4/2008 | Ogiso et al. | |
| 7,424,007 B2 * | 9/2008 | Meier et al. | 370/352 |
| 7,477,616 B2 * | 1/2009 | Wang et al. | 370/311 |
| 7,573,841 B2 * | 8/2009 | Lee et al. | 370/311 |
| 2002/0172165 A1 | 11/2002 | Rosen et al. | |
| 2003/0185162 A1 * | 10/2003 | Fraser et al. | 370/311 |
| 2004/0090929 A1 * | 5/2004 | Laux et al. | 370/311 |
| 2004/0181703 A1 | 9/2004 | Lilja et al. | |
| 2004/0218556 A1 | 11/2004 | Son et al. | |
| 2004/0253996 A1 | 12/2004 | Chen et al. | |
| 2004/0258039 A1 | 12/2004 | Stephens | |
| 2005/0190709 A1 * | 9/2005 | Ferchland et al. | 370/311 |

FOREIGN PATENT DOCUMENTS

| | | |
|---|---|---|
| TW | 235564 | 7/2005 |
| WO | 03/069933 | 8/2003 |

OTHER PUBLICATIONS

Coffey et al., "WWiSE IEEE 802.11n Proposal", IEEE 802.11-05/0737r0, (Jul. 19, 2005).

De Courville et al., *Handset Related Technical Requirements for IEEE 802.11n*, IEEE P802.11 Wireless LANs, White Paper, IEEE 802.11-05/xxxxr0, (May 2005).

Enhanced Wireless Consortium, *Proposed HT MAC Specification*, Version V1.08, (2005).

IEEE, *IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications: Amendment: Medium Access Control (MAC) Quality of Service (QoS) Enhancements*, IEEE P802.11e/D13.0, (Jan. 2005).

IEEE, *Information Technology—Telecommunications and Information Exchange Between Systems—Local and Metropolitan Area Networks—Specific Requirements—Part 11: Wireless LAN Medium Access Control (MAC) and Physical Layer (PHY) Specifications*, ANSI/IEEE Std 802.11, 1999 Edition (R2003), (Reaffirmed Jun. 12, 2003).

Kose et al., *WWiSE Proposal: High Throughput Extension to the 802.11 Standard*, IEEE P802.11 Wireless LANs, IEEE 802.11-05/0149r1, (Jan. 2005).

Otal et al., "Power Saving Efficiency of a Novel Packet Aggregation Scheme for High-Throughput WLAN Stations at Different Data Rates", 2005 IEEE 61st Vehicular Technology Conference, 2005. VTC 2005-Spring. vol. 3, pp. 2041-2045, (May 30-Jun. 1, 2005).

Stephens et al., "TGn Sync MAC Questions for TGn", IEEE 802.11-05/0444r1, (May 17, 2005).

Syed Aon Mujtaba, *TGn Sync Proposal Technical Specification*, IEEE P802.11 Wireless LANs, IEEE 802.11-04/0889r44, (Mar. 2005).

* cited by examiner

| ORDER | INFORMATION | NAME | VALUE |
|---|---|---|---|
| 1 | CATEGORY | HT | TBD |
| 2 | ACTION | PSMP | 2 |
| 3 | PSMP PARAMETER SET | | |
| 4 ..END | STA INFO REPEATED N_STA TIMES | | |

METHOD AND SYSTEM FOR REDUCING POWER CONSUMPTION OF A WIRELESS TRANSMIT/RECEIVE UNIT

CROSS REFERENCE TO RELATED APPLICATION

This application claims the benefit of U.S. Provisional Application Nos. 60/700,808 filed Jul. 20, 2005 and 60/750,283 filed Dec. 14, 2005, which are incorporated by reference as if fully set forth.

FIELD OF INVENTION

The present invention is related to a wireless communication system including a plurality of wireless transmit/receive units (WTRUs), (i.e., mobile stations). More particularly, the present invention is related to a method and system for reducing power consumption of the WTRUs.

BACKGROUND

Figure 1:
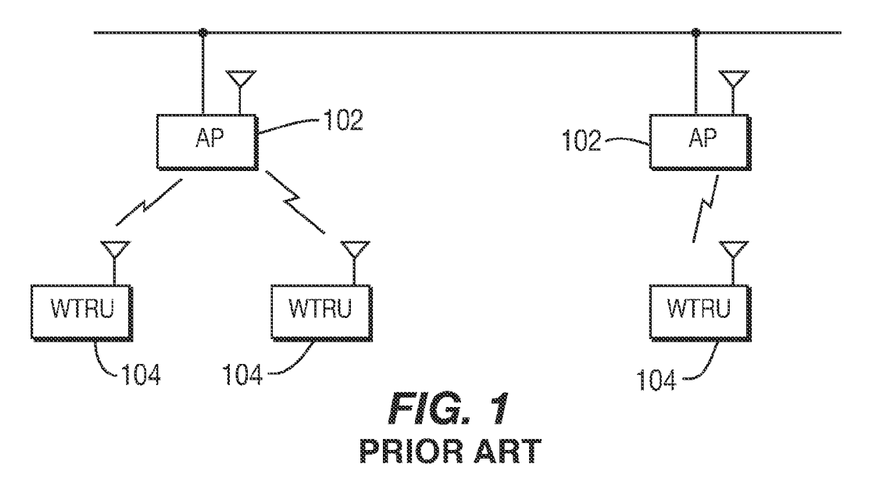
FIG. 1 shows a conventional infrastructure mode WLAN.

FIG. 1 shows a conventional infrastructure mode wireless local area network (WLAN) 100. The WLAN 100 includes at least one access point (AP) 102 which is associated with at least one WTRU 104. The AP 102 is responsible for servicing the communication needs of its associated WTRUs 104. The WTRU 104 sends uplink traffic to the AP 102, and the AP 102 sends downlink traffic to the WTRU 104. In an independent basic service set (IBSS), WTRUs 104 talk directly to each other in an ad-hoc manner without the need for an AP 102 to be present.

In IEEE 802.11 WLAN systems, a WTRU 104 continuously listens to, (i.e., monitors), the wireless medium to determine if there are frames being transmitted. If there are frames being transmitted on the wireless medium, the WTRU 104 receives and decodes such frames in order to determine whether such frames are destined, (i.e., addressed), to itself or not. Listening or receiving and decoding frames consume significant power of the WTRU 104 as summarized in Table 1. Table 1 describes different states of the WTRU 104 and its power consumption level in each state.

TABLE 1

| State | Generic description | approximate average power consumption (peak consumption = 100%) |
|---|---|---|
| Active Tx | Device in the process of transmitting a burst | 80% |
| Active Rx | Device in the process of receiving a burst | 50% |
| Listen | Device actively listening to the medium | 30% |
| Standby | Device ignoring the medium, but capable of Active Tx, Active Rx, and Listen within a short time span (typically <10 μs) | 5% |
| Sleep | Device substantially turned off, with change time to a different state in the order of >1 ms | <0.1% |

The problem with the conventional WLAN 100 is that a WTRU 104 may spend a lot of time in a listen state only to find out that there are few or no frames being transmitted on the wireless medium, and may spend a lot of time in an active receive state only to find out that the frames it received, (i.e., demodulated and decoded), are not destined to the WTRU 104.

Conventional power saving schemes attempt to reduce the amount of time that a WTRU 104 spends in the active receive or listen states and to increase the amount of time that the WTRU 104 spends in the standby or sleep states. One example is automatic power save delivery (APSD) defined in IEEE 802.11e. IEEE 802.11e defines scheduled APSD (S-APSD) and unscheduled APSD (U-APSD).

In S-APSD, an AP 102 and a WTRU 104 agree on scheduled intervals during which the AP 102 will deliver data that is destined to the WTRU 104. Since the WTRU 104 has agreed with the AP 102 on specific time intervals for scheduling its data, the WTRU 104 may go into a sleep state, (i.e., the WTRU 104 does not listen to, receive or decode frames), during all other times except for its scheduled service interval that it agreed upon with the AP 102. Doing so provides high power savings for the WTRU 104, because the WTRU 104 can spend more time in the sleep or standby states.

However, a drawback of the S-APSD scheme is complexity and lack of flexibility. The S-APSD scheme is complex due to its pre-scheduled nature, where both the AP 102 and the WTRU 104 have to agree upon, and meet, tight timing constraints. For example, the WTRU 104 has to wake up at strict times, and the AP 102 has to schedule data for the WTRU 104 during such strict times. In addition, the S-APSD scheme is not efficiently scalable from the AP's perspective, since the AP 102 has to store the scheduling intervals that the AP 102 agreed upon with each WTRU 104. As the number of WTRUs 104 grows, the AP 102 memory requirements will also grow. Additionally, because the AP 102 cannot send the data for the WTRU 104 immediately when the medium is available, but has to wait for that WTRU's scheduled interval, a delay and delay variation may be higher when using the S-APSD scheme.

On the other hand, in a U-APSD, the WTRU 104 may sleep, and wake up on its own to send a trigger frame to the AP 102. In reaction to the trigger frame, the AP 102 may send data to the WTRU 104. Drawbacks of the U-APSD are that when a WTRU 104 wakes up to send a trigger frame, it effectively consumes more power since the active transmit state consumes the most power. In addition, the U-APSD scheme may potentially waste the wireless medium, because the AP 102 may not have any data to send to the WTRU 104 in response to the trigger frame. Another problem with the U-APSD scheme is that the WTRU 104 may cause a collision since the WTRU 104 may not detect the channel as busy.

To enhance throughput in the new IEEE 802.1 in standard, several frame aggregation mechanisms have been introduced, such as medium access control (MAC) protocol data unit (MPDU) aggregation, physical layer (PHY) PDU (PPDU) aggregation, and PPDU bursting. Since such mechanisms generally aggregate multiple frames, new mechanisms such as multiple receiver aggregate (MRA) multi-poll (MMP) and power saving aggregation descriptor (PSAD) have been proposed in order to improve power saving performance.

The basic idea underlying the MMP and PSAD is that since an aggregated frame may be quite long, instead of having a WTRU 104 receive the entire aggregated frame only to find out that it does not have data within it, the AP 102 first sends an MMP or PSAD frame to describe which WTRUs' addresses are included in the subsequent aggregated frame. The AP 102 first sends a frame to preannounce the destinations and transmission times of the upcoming sequence of data. WTRUs 104 which have data in the upcoming sequence can sleep and only start listening or receiving their data at the scheduled (pre-announced) times. WTRUs 104 that do not have data within the upcoming sequence can also save power by sleeping during the upcoming data sequence.

Figure 2:
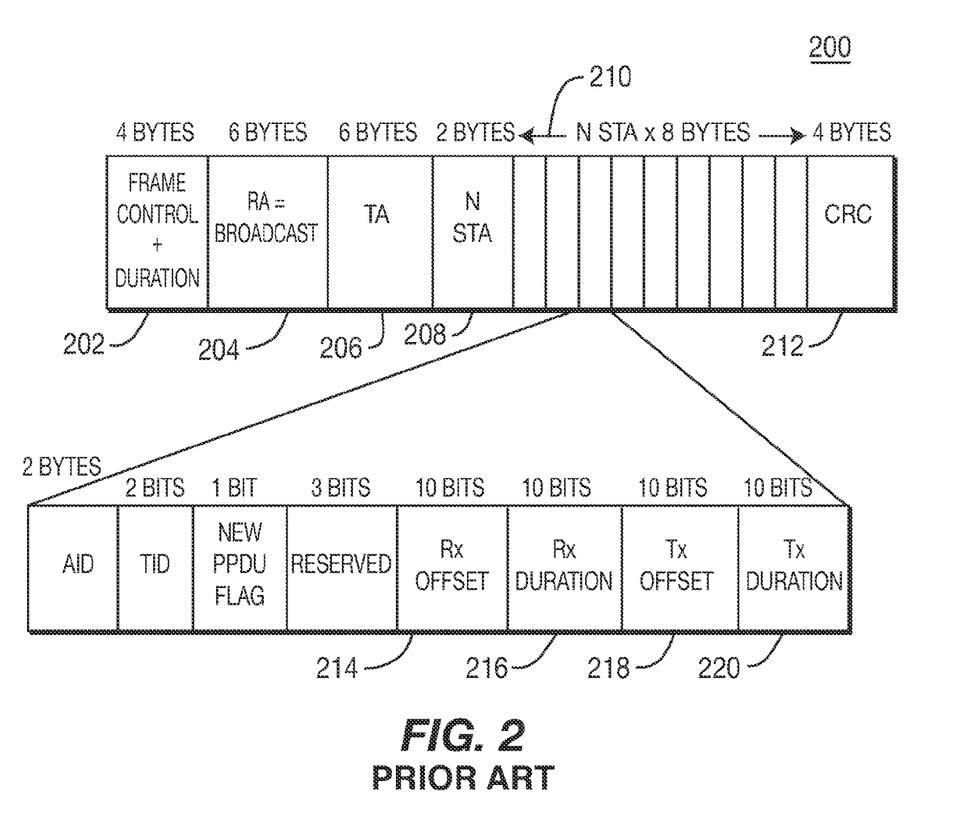
FIG. 2 shows a conventional MMP frame format.

FIG. 2 shows a conventional MMP frame 200. The MMP frame 200 is used to define multiple response periods in combination with multiple-receiver aggregation. The MMP frame 200 includes a frame control/duration field 202, a receiver address field 204, a transmitter address field 206, an N STA field 208, receiver information fields 210 and a cyclic redundancy check (CRC) field 212. The N STA field 208 indicates the number of receivers for which MPDUs are included inside the MRA aggregate. The receiver information fields 210 indicate each receiver address in the MRA aggregate. Each receiver information field 210 includes a receive offset field 214, a receive duration field 216, a transmit offset field 218 and a transmit duration field 220. The receive offset field 214 defines the start of the first symbol containing downlink data for the WTRU relative to the start of the PPDU carrying the MMP. The receive duration field 216 defines the length of the downlink data. The transmit offset field 218 defines the time when transmissions by this WTRU may start. The transmit duration field 220 defines the limit of transmission duration.

Figure 3:
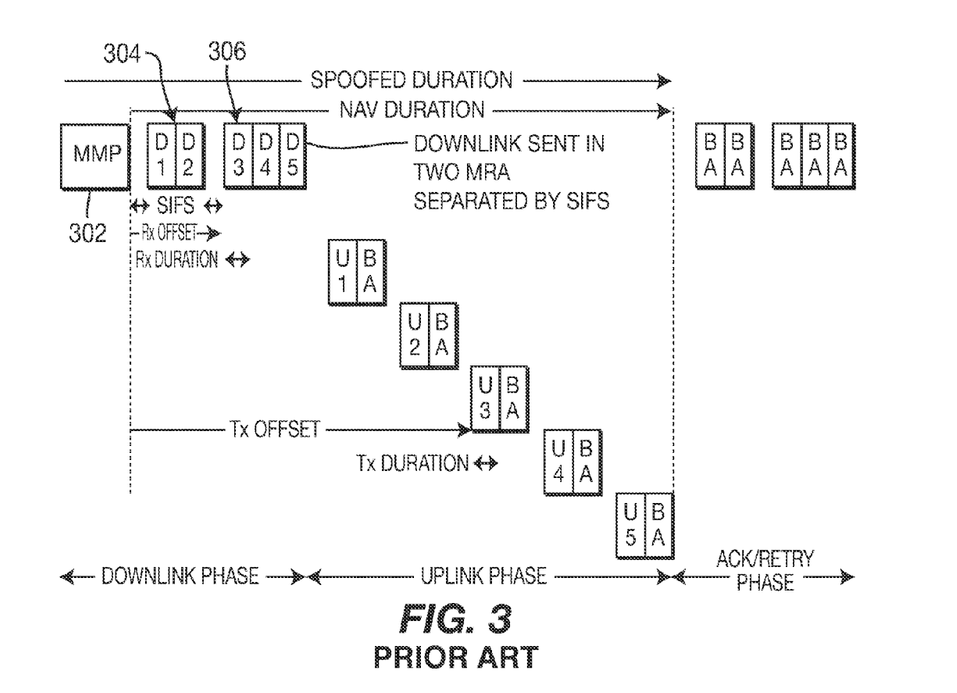
FIG. 3 shows a conventional process for the MMP frame exchange between an AP and a plurality of WTRUs.

FIG. 3 shows a conventional process for the MMP frame exchange between an AP 102 and plurality of WTRUs 104. The AP 102 sends an MMP frame 302 to the WTRUs 104. The MMP frame 302 includes the uplink and downlink transmission schedule. After a short inter-frame spacing (SIFS), the AP 102 sends downlink data to the WTRUs 104 which are scheduled by the receive offset and receive duration for each recipient WTRU 104 in the MMP frame 302. FIG. 3 shows transmission of downlink frame to five (5) WTRUs 104 which are sent in two MRA frames 304, 306 separated by the SIFS. Each WTRU 104 sends an uplink transmission in a scheduled period by the transmit offset and transmit duration. The receive offset and the transmit offset are set with reference to the completion of the transmission of MMP frame 302.

Figure 4:
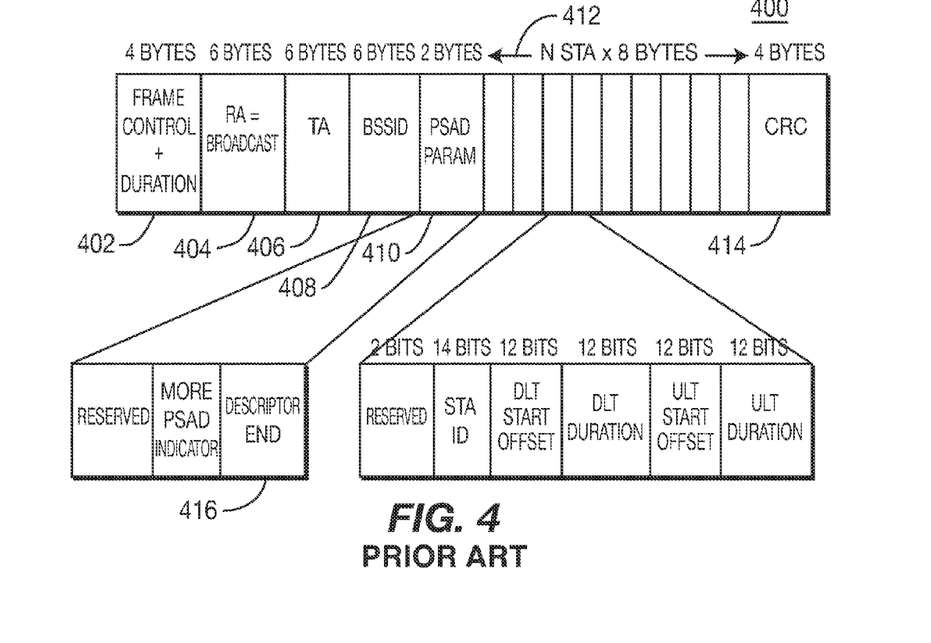
FIG. 4 shows a conventional PSAD frame format.

FIG. 4 shows a conventional PSAD frame 400. The PSAD frame 400 includes a frame control/duration field 402, a receiver address field 404, a transmitter address field 406, a basic service set identity (BSSID) field 408, a PSAD parameter field 410, a receiver information field 412 and a CRC field 414. The PSAD parameter field 410 is used to describe power save aggregation (PSA) access phase (PAP) which immediately follows the PSAD frame 400. The duration field 402 indicates the total time duration of all of the downlink and uplink transmission opportunities (TXOPs) which are described in the receiver information fields 412. The PSAD parameter field 410 includes a descriptor end field 416, which indicates the duration of the PAP which is described by the PSAD frame 400.

According to the IEEE 802.11n joint proposal specification and the enhanced wireless consortium (EWC) specification, a power save multi-poll (PSMP) feature has been introduced. A PSMP frame is a MAC management action frame with destination address set to broadcast that provides a time schedule for downlink transmission (DLT) and uplink transmission (ULT) to be used by the PSMP transmitter and PSMP receivers. The scheduled time begins immediately subsequent to the transmission of the PSMP frame. The DLT is a period of time described by the PSMP frame and which is intended to be used for the reception of frames by PSMP receivers. The ULT is a period of time described by the PSMP frame and which is intended to be used for the transmission of frames by a PSMP receiver.

Figure 5A:
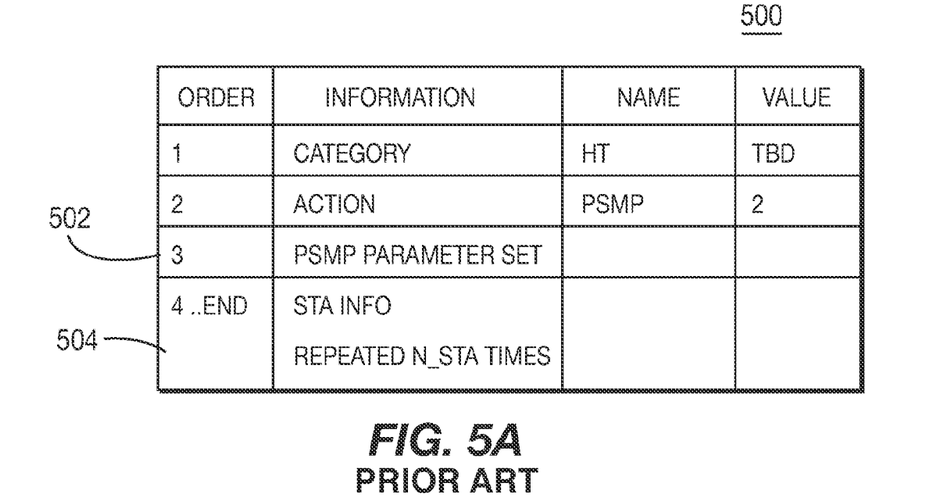
FIGS. 5A-5C show formats of a PSMP frame, a PSMP parameter set field of the PSMP frame and a STA_Info field of the PSMP frame.
Figure 5B:
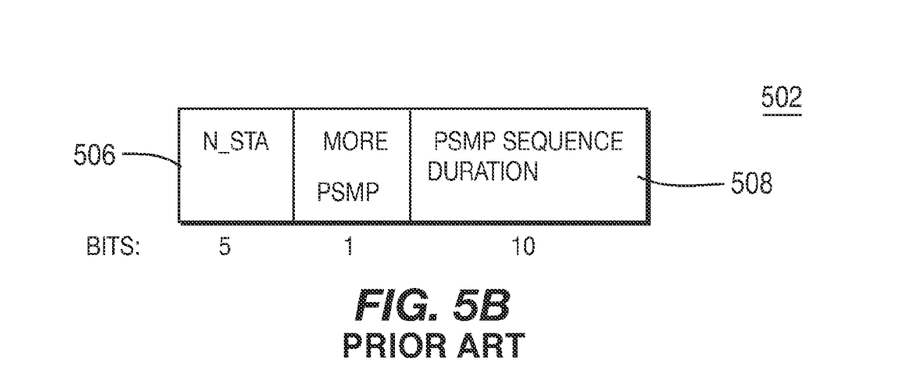
Figure 5C:
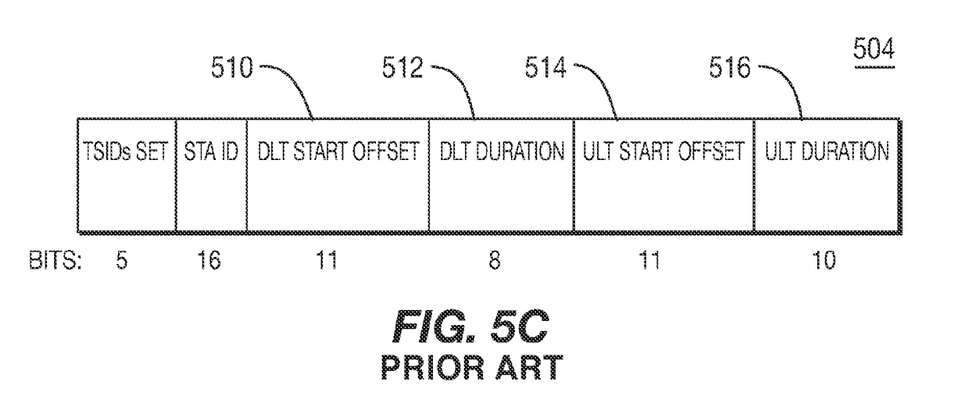

FIGS. 5A-5C show a format of the PSMP frame 500, a PSMP parameter set field 502 of the PSMP frame 500 and STA Info field 504 of the PSMP frame 500. The PSMP parameter set field 502 includes N_STA field 506 and a PSMP sequence duration field 508. The N_STA field 506 indicates the number of STA Info fields present. The PSMP sequence duration field 508 indicates the duration of the current PSMP exchange which is described by the PSMP frame relative to the end of the PSMP frame. Each STA info field 504 includes a DLT start offset field 510, a DLT duration field 512, a ULT start offset field 514 and a ULT duration field 516 to schedule the DLT and the ULT.

The MMP, PSAD and PSMP schemes achieve their power savings basically by converting most of the time that WTRUs 104 unnecessarily spend in the active receive state into time in either the sleep or standby states, through pre-identifying which WTRUs or groups of WTRUs are targeted by the upcoming transmissions on the wireless medium.

The drawbacks with the MMP, PSAD and PSMP schemes are that they require some form of pre-scheduling, albeit on a smaller scale and more short-term than IEEE 802.11e APSD scheduling. MMP, PSAD and PSMP frames also have significant overhead, and hence are not very efficient in using the wireless medium. The MMP, PSAD and PSMP schemes provide power savings only when there are frames being transmitted, (i.e., when the wireless medium is being utilized), and do not provide power savings when the wireless medium is idle.

SUMMARY

The present invention is related to a method and system for reducing power consumption of a WTRU. A first WTRU measures a predetermined parameter and determines whether the measured predetermined parameter exceeds a threshold. If so, the first WTRU sends a sleep frame to a second WTRU. The sleep frame indicates sleep duration. The second WTRU receives the sleep frame and enters a sleep state for the sleep duration. The predetermined parameter may be an inactivity time of the wireless medium. The first WTRU may wait for a minimum wait time before measuring the predetermined parameter. The second WTRU may or may not be allowed to send a transmission to the first WTRU during the sleep duration. The sleep frame may be a control frame, a management frame, a data frame or an action frame. One of a MMP frame, a PSAD frame, a PSMP frame may be used as the sleep frame.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

When referred to hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "AP" includes but is not limited to a base station, a Node-B, a site controller or any other type of interfacing device in a wireless environment. The AP may be a WTRU.

The features of the present invention may be incorporated into an integrated circuit (IC) or be configured in a circuit comprising a multitude of interconnecting components.

Hereinafter, the present invention will be explained with reference to infrastructure mode WLAN including an AP and a WTRU. However, it should be noted that the present invention is applicable to any wireless communication system including, but not limited to, ad-hoc mode WLAN, WLAN mesh networks, WIMAX networks, or cellular networks, such as wideband code division multiple access (WCDMA), CDMA2000, universal mobile telecommunication system (UMTS) long term evolution (LTE), high speed downlink packet access (HSDPA), HSDPA evolution, high speed uplink packet access (HSUPA), HSUPA evolution, or the like.

Figure 6:
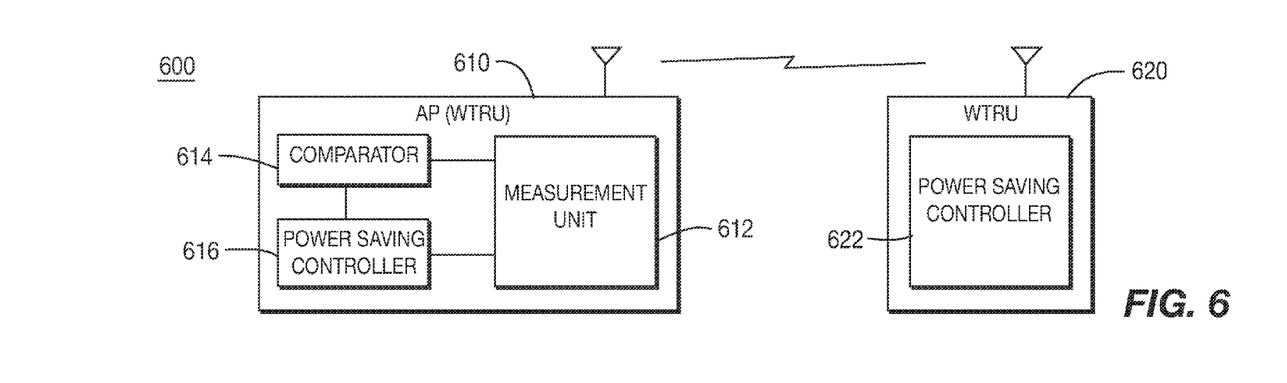
FIG. 6 shows a wireless communication system including at least one AP and at least one WTRU configured in accordance with the present invention.

The present invention introduces a sleep frame for reducing power consumption of a WTRU and more efficient use of a wireless medium. FIG. 6 shows a wireless communication system 600 including at least one AP 610 and at least one WTRU 620 configured in accordance with the present invention. The AP 610 maybe a WTRU. The AP 610 decides to send a sleep frame to at least one WTRU 620 associated with the AP 610 according to some criteria. The sleep frame instructs all or some WTRUs 620 within the coverage area of the AP 610 to go into a sleep state, (or a standby state, hereinafter "sleep state" collectively), for a given time duration, (i.e., sleep duration). Using the sleep frame, the AP 610 indicates to all or some of its associated WTRUs 620 that no traffic will be sent by the AP 610 to the WTRUs 620 during the sleep duration, and the WTRUs 620 may enter a sleep state for the sleep duration.

The AP 610, (or a WTRU), includes a measurement unit 612, a comparator 614 and a power saving controller 616. The measurement unit 612 measures a predetermined parameter, which will be explained hereinafter. The comparator 614 compares the measured predetermined parameter with a threshold. The power saving controller 616 is configured to send a sleep frame to at least one WTRU 620 if the measured predetermined parameter exceeds the threshold, whereby the WTRU 620 enters a sleep state for the sleep duration. The WTRU 620 includes a power saving controller 622 which is configured to receive the sleep frame from the AP 610 and trigger a transition to a sleep state for the sleep duration.

Figure 7:
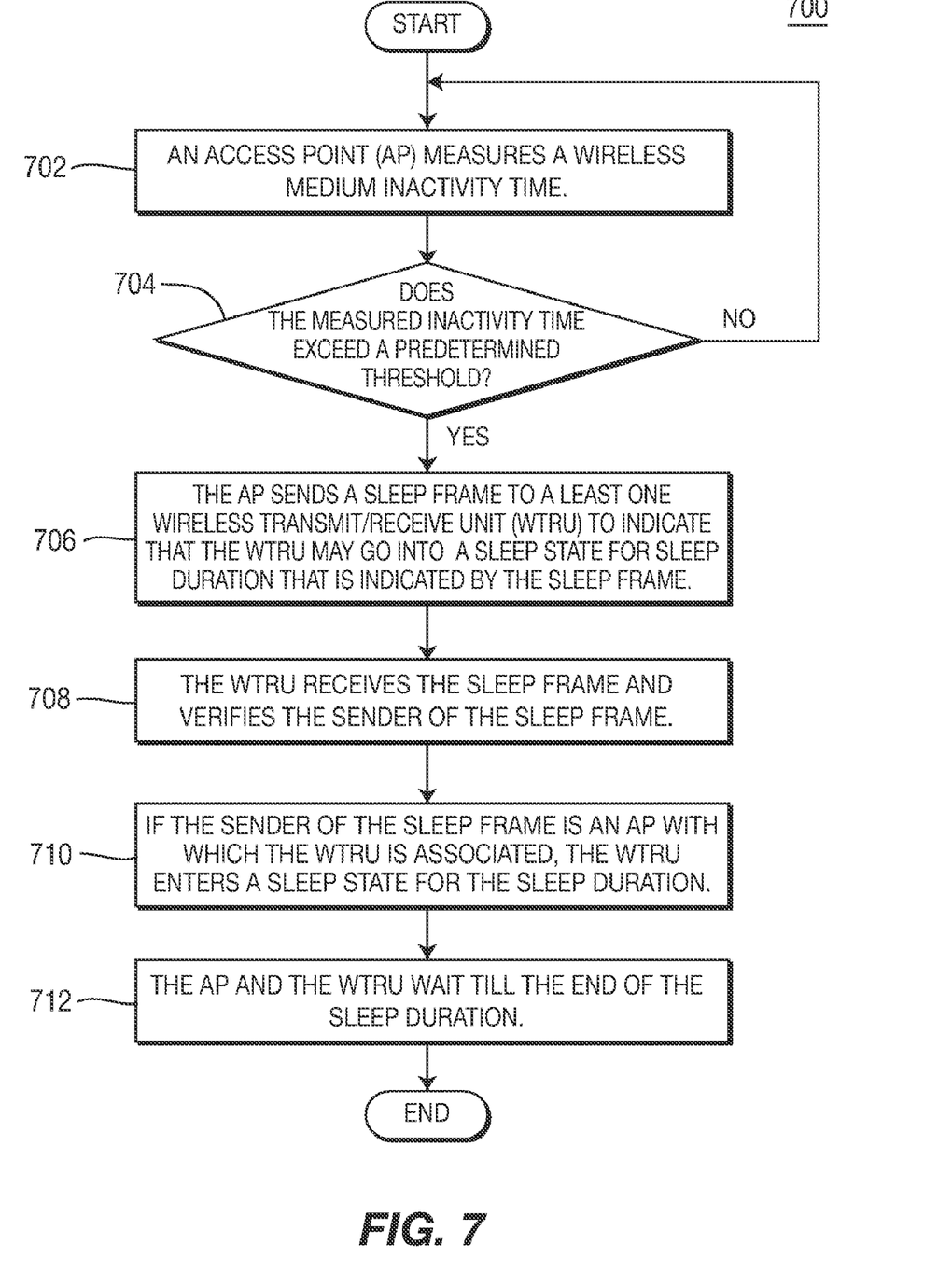
FIG. 7 is a flow diagram of a process of power management with a sleep frame in accordance with the present invention.

FIG. 7 is a flow diagram of a process 700 of sending a sleep frame in accordance with the present invention. An AP 610 measures a wireless medium inactivity time, (i.e., idle time) (step 702). The inactivity time may be defined in many different ways. For example, the inactivity time may be defined as the time which has elapsed since the last relevant frame was sent over the wireless medium. The relevant frame is a frame that was sent by the AP 610 or any one of its associated WTRUs 620. Every time a new relevant frame is sent, the inactivity time is reset, and the measurement of the inactivity time starts again. Optionally, the AP 610 may wait for a minimum wake-up time before measuring the wireless medium inactivity time. The minimum wake-up time refers to a small duration specified in the system to allow for WTRUs to wake up before the AP 610 measures the inactivity time.

The AP 610 then determines whether the measured inactivity time exceeds a predetermined threshold (step 704). If the measured inactivity time does not exceed the predetermined threshold, the process 700 returns to step 702 to further measure the wireless medium inactivity time. If the measured inactivity time exceeds the predetermined threshold, the AP 610 sends a sleep frame to at least one WTRU 620 to indicate that the WTRU 620 may go into a sleep state for the sleep duration that is indicated by the sleep frame (step 706).

Upon receipt of the sleep frame, the WTRU 620 verifies the sender of the sleep frame (step 708). Such verification may be performed by comparing the transmitter address (TA) field, the basic service set identity (BSSID) field, or any relevant addressing field, against the address of the AP 610. If the sleep frame is not sent from the associated AP 610, the WTRU 620 does not go into a sleep state.

If the sender of the sleep frame is an AP 610 with which the WTRU 620 is associated, the WTRU 620 enters a sleep state based on the sleep frame (step 710). The AP 610 and the WTRU 620 then wait till the end of the sleep duration (step 712) and the process 700 returns to step 702 to measure the inactivity time upon expiration of the sleep duration.

During the sleep duration, the WTRU 620 is preferably not allowed to send uplink data to the AP 610. Alternatively, the choice of allowing or disallowing transmission of uplink data during the sleep duration may be indicated by a specific field in the sleep frame. Another alternative is to allow the transmission of uplink data to the AP 610 as a default, (i.e., without having to indicate it in the sleep frame).

When the WTRU 620 is allowed to send uplink traffic to the AP 610 during the sleep duration, some of the frames of the WTRU 620 may require responses from the AP 610, (e.g., in the form of an acknowledgement (ACK) or a block ACK (BA)). In this case, even though the AP 610 is not supposed to initiate downlink traffic to the WTRU 620 during the sleep duration, the AP 610 may transmit the necessary downlink responses, (such as an ACK or a BA), to such WTRU 620 during the sleep duration. Additionally, the AP 610 may send aggregate (piggyback) data with such responses, if the AP 610 has data destined to the WTRU 620.

A WTRU 620 that is allowed to initiate the uplink transmission during the sleep duration may signal a reverse direction grant (RDG) to the AP 610. The RDG indicates the amount of time that is available for a reverse direction PPDU. In such case, the AP 610 may respond to the RDG by transmitting the downlink traffic to the WTRU 620. Alternatively, the AP 610 may ignore the RDG during the sleep duration, and may send nothing or send a frame indicating that the AP 610 does not intend to transmit downlink traffic to the WTRU 620 at this time, (i.e., during the sleep duration). In another alternative, the WTRU 620 may not be allowed to signal an RDG during the sleep duration.

The sleep duration may be on the order of a TXOP limit, (e.g., 5 msec), but may be varied from time to time depending on other conditions, such as traffic load measurements or quality of service (QoS) requirements.

Figure 8:
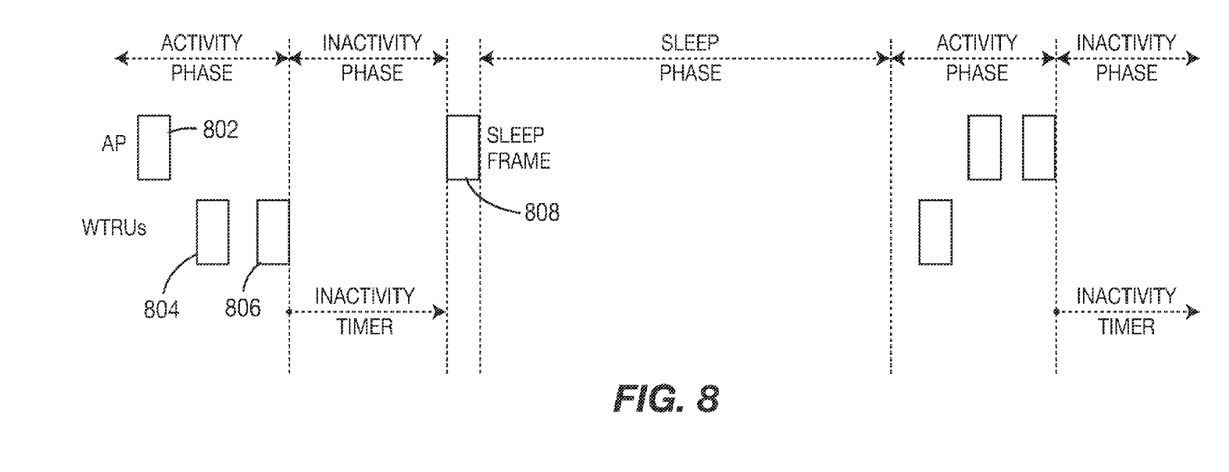
FIG. 8 shows an example of a frame exchange sequence in accordance with the present invention.

FIG. 8 shows an exemplary process of a frame exchange in accordance with the present invention. A downlink frame 802 and uplink frames 804, 806 are exchanged between a WTRU 620 and an AP 610. After the transmission of the uplink frame 806, the wireless medium becomes inactive. The AP 610 continuously measures the inactivity time. When the inactivity time exceeds a predetermined threshold, the AP 610 sends a sleep frame 808. The predetermined threshold should be long enough to cover the contention window maximum, (e.g., 0.3 msec). The sleep frame 808 tells WTRU 620 that they may go into a sleep state for the sleep duration, (e.g., 5 msec). Upon expiration of the sleep duration, the exchange of uplink and downlink frames are resumed.

A main difference of the present invention from conventional APSD, MMP, PSAD or PSMP schemes is that the AP 610 does not have to pre-assign specific time schedules for wake-up. This relieves the AP 610 from the need to store the time schedule that the AP 610 indicated to each WTRU 620, and also relieves the WTRU 620 from storing the time schedule and adhering to it in a strict manner. This also provides power savings for WTRUs that do not support the conventional APSD, MMP, PSAD or PSMP capability.

It should be noted that in FIGS. 7 and 8, the wireless medium inactivity time is used as an exemplary input to the decision making process for sending the sleep frame. However, other parameters may be considered for the decision. The other parameters include, but are not limited to, traffic load measurements, medium utilization measurements, amount of data in the AP or WTRU buffer, QoS parameters or requirements, the number of WTRUs and their traffic profiles, error rate measurements, (e.g., bit error rate (BER), packet loss rate (PLR), number of retransmissions and retrials), delay and jitter measurements, configuration parameters, or the like. These measurements may be made on a per access class (AC) basis when applicable.

The parameters that are used for determining whether and when to send a sleep frame may be dynamically varied over time. For example, the predetermined threshold with which the inactivity time, (or other parameter), is compared may be dynamically adapted based on other factors, measurements or conditions, such as traffic load measurements. Similarly, the sleep duration and the minimum wake-up time (if used) may also be dynamically adapted from time to time based on other factors, measurements, or conditions, such as traffic load measurements.

The sleep frame provides sleep duration and identities (IDs) of the WTRUs that should go into the sleep state. The sleep duration may be defined with reference to the sleep frame as a reference point. For example, the sleep duration may start as soon as the sleep frame ends. Alternatively, the sleep frame may specify the start time and duration, (or a start time and an end time), of the sleep duration.

The IDs of the WTRU 620 may be a broadcast address indicating all WTRUs 620 should go to a sleep state, a multicast address indicating some WTRUs 620 that should go into a sleep state or a list of unicast addresses indicating some specific WTRU 620 that should go into a sleep state. Alternatively, the WTRU 620 may be identified in a complementary manner, by identifying WTRUs 620 that should not go into a sleep state. For example, the ID may be a null or dummy address to indicate that all WTRUs 620 should go into a sleep state (since only the WTRU 620 that has the null or dummy address should not go to sleep). The ID may be a multicast address to indicate that those WTRUs 620 that do not belong to the multicast address should go into a sleep state. The ID may be a list of unicast addresses to indicate that those WTRUs 620 that do not belong to the address list should go into a sleep state.

The sleep frame may optionally provide additional information, such as: an indication of whether or not the WTRUs 620 may send uplink traffic during the sleep duration and an indication of whether or not the WTRUs 620 shall update their network allocation vector (NAV) duration in accordance with the sleep duration.

The sleep frame may be implemented using any type of frame, such as a control frame, management frame, data frame or action frame, that are currently existing conventional frames or a new frame. For example, the sleep frame may be implemented using a QoS poll frame, a contention free (CF) poll frame, a power save (PS) poll frame, a clear-to-send (CTS) frame, a request-to-send (RTS) frame, an MMP frame, a PSAD frame or a PSMP frame.

An MMP frame may be used to achieve sleep frame functionality in accordance with the present invention. The N STA field 208, (shown in FIG. 2), may be set to '0' or the N STA field 208 may be omitted to indicate that no upcoming frame sequences for WTRUs are present. After receiving the MMP frame, the WTRUs go into a sleep state for the sleep duration indicated by the duration value in the duration field of the MMP frame and may update the NAV with the duration value.

Alternatively, a gap which is longer than necessary gap between the transmission of the MMP frame and the scheduled frames (or frame responses) may be introduced to implement the sleep frame functionality. A time gap between subsequent uplink transmissions after the transmission of the MMP frame is usually an SIFS. Any gaps longer than the SIFS is equivalent to introduction of the sleep duration. An AP transmits an MMP frame which schedules, (i.e., polls for), a response from a WTRU a long time after the MMP frame is transmitted. The MMP frame schedules one or more uplink frames in a manner that allows unnecessary idle time between the MMP frame and the first scheduled uplink frame. This is equivalent to introduction of the sleep duration for the WTRUs that are not concerned by the MMP frame.

Alternatively, a dummy frame may be transmitted within the MMP sequence, (e.g., null or QoS null frames), that are destined to real or dummy WTRUs. The dummy frame is any frame that is not useful for its receiving WTRU's upper layers. The dummy frame is simply used as a way to occupy the wireless medium instead of keeping it idle. If real WTRUs are used as the destination WTRUs, those WTRUs obviously do not need or care much about saving as much power, since they are made to receive dummy data. Dummy WTRUs may be WTRUs that are not associated with the AP or WTRUs having dummy or fictitious medium access control (MAC) addresses which do not correspond to any address of those real WTRUs that are associated with the AP. The dummy frame may simply contain a MAC address that is not used in the AP area, or that will never be used by any WTRU. There is no need for the dummy WTRUs to physically exist. This is equivalent to sleep duration for those WTRUs that are not concerned by the dummy frames.

The PSAD frame may also be used to achieve the sleep frame functionality in accordance with the present invention. All the solutions described with reference to the MMP frame hereinbefore are applied to the PSAD frame case. The PSAD parameter field 410 (shown in FIG. 4) may be set, or omitted, to indicate no WTRUs 620 are described in the PSAD frame. Alternatively, by sending a dummy frame, (e.g., a null frame or a QoS null frame), or by scheduling, (i.e., polling for), a delayed responses from one or more WTRUs 620 with some unused idle time inserted between the PSAD frame and the responses, or between responses, the sleep duration may be introduced.

The sleep duration may be indicated using the spoofed duration, the NAV duration and/or via using length and rate fields of the IEEE 802.11n signal field or the legacy signal field. As an example, the AP 610 may send a null or a QoS null data frame with a spoofed duration that is longer than the actual frame duration when the wireless medium is idle, in order to effectively achieve the sleep frame functionality.

When a PSMP frame is used as a sleep frame, the duration/ID field of the MAC header of the PSMP frame or the duration of the PLCP signal fields, (e.g., spoofed duration in legacy signal field, or duration of HT signal field), are used to control the duration during which uplink transmissions by WTRUs 620 are not allowed, (via NAV setting). Alternatively, the PSMP sequence duration field 508 (which is shown in FIG. 5B) may be used for specifying the sleep duration. The PSMP sequence duration field 508 indicates the duration of the current PSMP exchange which is described by the PSMP frame. The sleep duration may simply be equal to the value specified in the PSMP sequence duration field 508. Alternatively, the number of bits for the conventional PSMP sequence duration field 508 may be increased in order to allow a higher maximum value, (i.e. higher than 4 ms), for the sleep duration, whereby allowing for longer sleep duration and more efficient sleeping behavior and power saving. Alternatively, the minimum resolution or the granularity of the PSMP sequence duration field 508 may be increased from conventional 8 μs to a larger value, which will permit achieving a maximum value larger than current 4 ms for the maximum sleep duration. For example, by using a granularity value of 0.5 ms or of 1 ms, assuming 9-bits for the PSMP sequence duration field 508, maximum sleep duration of around 256 ms and 512 ms may be achieved, respectively. One or more of the previous variants may be combined together.

The granularity or resolution of the sleep duration may be dynamically specified. The implicit identification of the PSMP frame as the sleep frame may cause the recipient WTRU 620 to utilize the other (higher) value of granularity when calculating the sleep duration from the PSMP sequence duration field 508 (shown in FIG. 5B). For example, since the sleep frame may be identified as receiving a PSMP frame that does not contain any ULT or DLT entries, (i.e. receiving a PSMP frame that does not contain any STA INFO fields 504, which can be referred to as an 'empty' PSMP frame), upon identifying such empty PSMP frame, the WTRU 620 uses the new granularity value for the PSMP sequence duration field 508, (e.g., instead of using 8 μs granularity, the WTRU 620 uses the higher granularity, (e.g., 1 ms), in calculating the sleep duration).

Alternatively, a special field, a scaling field, is included in the PSMP frame, (e.g., within the PSMP parameter set field 502), to indicate the granularity of the PSMP sequence duration field 508. For example, one of the reserved bits in the PSMP parameter field may be used to indicate whether the higher granularity or the lower granularity should be utilized. The advantage of having the scaling field is that it requires fewer bits to convey a certain maximum value of duration, instead of having to utilize many more bits to increase the size of the PSMP sequence duration field 508. The scaling field may also utilize more than one bit to define more than two duration granularities, (e.g., 2 bits may be used to communicate up to 4 levels of granularity). The scaling field may be included anywhere within the header or the body of the PSMP frame or any other frame. Fields in the HT control field or the HT signal field may be used to carry information related to the sleep frame.

The scaling field may be used to scale or to indicate different levels of granularity for any duration field or any time-based field, such as the duration/ID field, the spoofed duration field, ULT/DLT start offset, ULT/DLT duration, or any other field, without the need to significantly increase the number of bits in such fields.

In accordance with the present invention, the AP 610 sends a capability information field to indicate its capability to support for sleep frames for power management. The capability information field indicates whether or not the AP 610 supports the sleep frame in accordance with the present invention, and if supports the sleep frame, what frames are used as the sleep frame. The capability information field may be contained within the beacon or the probe response frames or within the association request or re-association request frames.

The present invention is used to achieve power savings. The present invention may also be used to improve the efficiency of the wireless medium by reducing medium contention. By making certain WTRUs go into a sleep state while others remain awake, the number of awake WTRUs contending for the wireless medium becomes smaller and throughput may be enhanced.

This may be applied on an access class (AC) basis. A WTRU having data in certain AC goes into a sleep state, while the WTRU may be awake, (allowed to send and receive), for data in other ACs. The sleep frames may be used in the context of interference or noise measurements, (e.g., for silent measurement period (SMP)).

Although the features and elements of the present invention are described in the preferred embodiments in particular combinations, each feature or element can be used alone without the other features and elements of the preferred embodiments or in various combinations with or without other features and elements of the present invention.

What is claimed is:

1. In a wireless communication system including a plurality of wireless transmit/receive units (WTRUs), a method of reducing power consumption of the WTRU, the method comprising:
    a first WTRU measuring a predetermined parameter;
    the first WTRU determining whether the measured predetermined parameter exceeds a threshold;
    if the measured predetermined parameter exceeds the threshold, the first WTRU sending a sleep frame to at least one second WTRU, the sleep frame indicating a sleep duration; and
    the second WTRU receiving the sleep frame and entering a sleep state for the sleep duration;
    wherein the sleep frame is a power save multi-poll (PSMP) frame.

2. The method of claim 1 wherein the predetermined parameter is an inactivity time of a wireless medium.

3. The method of claim 2 wherein the inactivity time is defined as the time which has elapsed since a last relevant frame was sent over wireless medium, the relevant frame being a frame transmitted by either the first WTRU or the second WTRU.

4. The method of claim 1 wherein the predetermined parameter is at least one of an amount of data stored in a buffer of the first WTRU and an amount of data stored in a buffer of the second WTRU.

5. The method of claim 1 wherein the predetermined parameter includes at least one of an idle time, a traffic load, wireless medium utilization, quality of service (QoS) requirements, a number of the second WTRUs associated to the first WTRU, a traffic profile of the second WTRU, access class (AC) of data, error rate and delay and jitter.

6. The method of claim 1 further comprising:
    the first WTRU waiting for a minimum wait time before measuring the predetermined parameter.

7. The method of claim 1 further comprising:
    the second WTRU verifying a sender of the sleep frame, whereby the second WTRU enters a sleep state only if the sender of the sleep frame is a WTRU with which the second WTRU is associated.

8. The method of claim 1 wherein the second WTRU is not allowed to send a transmission to the first WTRU during the sleep duration.

9. The method of claim 1 wherein the second WTRU is allowed to send a transmission to the first WTRU during the sleep duration.

10. The method of claim 1 wherein the first WTRU includes an indication in the sleep frame that the second WTRU may send a transmission to the first WTRU during the sleep duration.

11. The method of claim 9 wherein the second WTRU is allowed to send a reverse direction grant (RDG) to the first WTRU.

12. The method of claim 11 wherein the first WTRU responds to the RDG by transmitting data to the second WTRU.

13. The method of claim 11 wherein the first WTRU ignores the RDG during the sleep duration.

14. The method of claim 13 wherein the first WTRU sends a frame indicating that the first WTRU does not intend to send a transmission to the second WTRU during the sleep duration.

15. The method of claim 1 wherein the sleep duration is on the order of a transmit opportunity (TXOP) limit.

16. The method of claim 1 wherein the sleep duration is dynamically adjusted depending on other conditions.

17. The method of claim 16 wherein the other conditions include at least one of traffic load measurements and quality of service (QoS) requirements.

18. The method of claim 1 wherein the threshold is dynamically adjusted depending on other factors.

19. The method of claim 1 wherein the sleep duration starts as soon as the sleep frame ends.

20. The method of claim 1 wherein the sleep frame specifies a start point and an end point of the sleep duration.

21. The method of claim 1 wherein the sleep frame includes an identification of the second WTRU that should go into a sleep state.

22. The method of claim 21 wherein the identification is at least one of a broadcast address, a multicast address and a list of unicast addresses.

23. The method of claim 21 wherein the identification is given in a complementary manner, whereby the sleep frame identifies second WTRUs that should not go into a sleep state.

24. The method of claim 1 wherein the sleep frame includes an indication of whether or not the second WTRU shall update a network allocation vector (NAV) duration in accordance with the sleep duration.

25. The method of claim 1 wherein an N STA field of the PSMP frame is set to '0' to indicate that no upcoming frame sequences for the second WTRU are present.

26. The method of claim 1 wherein an N STA field of the PSMP frame is omitted to indicate that no upcoming frame sequences for the second WTRU are present.

27. The method of claim 1 wherein the first WTRU sends the PSMP frame which schedules at least one transmission from the second WTRU in a manner that allows unnecessary idle time between the sleep frame and the first scheduled uplink frame or the scheduled uplink frames.

28. The method of claim 1 wherein the PSMP frame includes a schedule for a dummy frame.

29. The method of claim 1 wherein a PSMP sequence duration field of the PSMP frame is used for specifying the sleep duration.

30. The method of claim 29 wherein the sleep duration is equal to the value specified in the PSMP sequence duration field.

31. The method of claim 29 wherein additional bits are used for the PSMP sequence duration field to allow a higher maximum value for the sleep duration.

32. The method of claim 29 wherein a minimum resolution of the PSMP sequence duration field is increased to achieve a larger value for a maximum sleep duration.

33. The method of claim 1 wherein a resolution of the sleep duration is dynamically adjusted.

34. The method of claim 33 wherein the dynamic adjustment of the resolution of the sleep duration is indicated implicitly.

35. The method of claim 33 wherein the sleep frame includes a scaling field to indicate the resolution of the sleep duration.

36. The method of claim 35 wherein the scaling field indicates more than two duration granularities.

37. The method of claim 35 wherein the scale field indicates different levels of granularity for at least one of a duration/ID field, a spoofed duration field, uplink transmission start offset, downlink transmission start offset, uplink transmission duration and downlink transmission duration.

38. The method of claim 1 further comprising:
the first WTRU sending capability information to indicate its capability to support for the sleep frame for power management.

39. The method of claim 38 wherein the capability information is included in at least one of a beacon frame, a probe response frame, an association request frame and a re-association request frame.

40. In a wireless communication system including a plurality of wireless transmit/receive units (WTRUs), an apparatus for reducing power consumption of the WTRU, the apparatus comprising:
a measurement unit for measuring a predetermined parameter;
a comparator for comparing the measured predetermined parameter with a threshold; and
a power saving controller electrically coupled to the measurement unit and the comparator and configured to send a sleep frame to at least one WTRU if the measured predetermined parameter exceeds the threshold, the sleep frame indicating a sleep duration, whereby the WTRU enters a sleep state for the sleep duration:
wherein the sleep frame is a power save multi-poll (PSMP) frame.

41. The apparatus of claim 40 wherein the predetermined parameter is an inactivity time of wireless medium.

42. The apparatus of claim 41 wherein the inactivity time is defined as the time which has elapsed since a last relevant frame was sent over wireless medium, the relevant frame being a frame transmitted by either the first WTRU or the second WTRU.

43. The apparatus of claim 40 wherein the predetermined parameter is at least one of an amount of data stored in a buffer of the first WTRU and an amount of data stored in a buffer of the second WTRU.

44. The apparatus of claim 40 wherein the predetermined parameter includes at least one of an idle time, a traffic load, wireless medium utilization, quality of service (QoS) requirements, a number of the second WTRUs associated to the first WTRU, a traffic profile of the second WTRU, access class (AC) of data, error rate and delay and jitter.

45. The apparatus of claim 40 wherein the power saving controller is configured to control the measurement unit to wait for a minimum wait time before measuring the predetermined parameter.

46. The apparatus of claim 40 wherein the sleep frame includes an indication that the WTRU may send data during the sleep duration.

47. The apparatus of claim 40 wherein the sleep duration is in the order of a transmit opportunity (TXOP) limit.

48. The apparatus of claim 40 wherein the power saving controller dynamically adjusts the sleep duration depending on other conditions.

49. The apparatus of claim 48 wherein the conditions include at least one of traffic load measurements and quality of service (QoS) requirements.

50. The apparatus of claim 40 wherein the power saving controller dynamically adjusts the threshold depending on other factors.

51. The apparatus of claim 40 wherein the sleep duration starts as soon as the sleep frame ends.

52. The apparatus of claim 40 wherein the sleep frame specifies a start point and an end point of the sleep duration.

53. The apparatus of claim 40 wherein the sleep frame includes an identification of the WTRU that should go into a sleep state.

54. The apparatus of claim 53 wherein the identification is at least one of a broadcast address, a multicast address and a list of unicast addresses.

55. The apparatus of claim 53 wherein the identification is given in a complementary manner, whereby the sleep frame identifies the WTRUs that should not go into a sleep state.

56. The apparatus of claim 40 wherein the sleep frame includes an indication of whether or not the WTRU shall update a network allocation vector (NAV) duration in accordance with the sleep duration.

57. The apparatus of claim 40 wherein an N STA field of the PSMP frame is set to '0' to indicate that no upcoming frame sequences for the second WTRU are present.

58. The apparatus of claim 40 wherein an N STA field of the PSMP frame is omitted to indicate that no upcoming frame sequences for the second WTRU are present.

59. The apparatus of claim 40 wherein the first WTRU sends the PSMP frame which schedules one or more transmissions from the second WTRU in a manner that allows unnecessary idle time between the sleep frame and the first scheduled uplink frame or the scheduled uplink frames.

60. The apparatus of claim 40 wherein the PSMP frame includes a schedule for a dummy frame.

61. The apparatus of claim 40 wherein a PSMP sequence duration field of the PSMP frame is used for specifying the sleep duration.

62. The apparatus of claim 61 wherein the sleep duration is equal to the value specified in the PSMP sequence duration field.

63. The apparatus of claim 61 wherein additional bits are used for the PSMP sequence duration field to allow a higher maximum value for the sleep duration.

64. The apparatus of claim 61 wherein a minimum resolution of the PSMP sequence duration field is increased to achieve a larger value for a maximum sleep duration.

65. The apparatus of claim 40 wherein a resolution of the sleep duration is dynamically adjusted.

66. The apparatus of claim 65 wherein the dynamic adjustment of the resolution of the sleep duration is indicated implicitly.

67. The apparatus of claim 65 wherein the sleep frame includes a scaling field to indicate the resolution of the sleep duration.

68. The apparatus of claim 67 wherein the scaling field indicates more than two duration granularities.

69. The apparatus of claim 67 wherein the scale field indicates different levels of granularity for at least one of a duration/ID field, a spoofed duration field, uplink transmission start offset, downlink transmission start offset, uplink transmission duration and downlink transmission duration.

70. The apparatus of claim 40 wherein the power saving controller is configured to send capability information to indicate its capability to support for the sleep frame for power management.

71. The apparatus of claim 70 wherein the capability information is included in at least one of a beacon frame, a probe response frame, an association request frame and a re-association request frame.

* * * * *